(12) United States Patent
Nakamura

(10) Patent No.: US 8,019,285 B2
(45) Date of Patent: Sep. 13, 2011

(54) WIRELESS COMMUNICATION DEVICE

(75) Inventor: Tadashi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 640 days.

(21) Appl. No.: 11/709,250

(22) Filed: Feb. 22, 2007

(65) Prior Publication Data
US 2008/0079634 A1 Apr. 3, 2008

(30) Foreign Application Priority Data
Sep. 29, 2006 (JP) ................................. 2006-266178

(51) Int. Cl.
H04B 17/00 (2006.01)

(52) U.S. Cl. .................... 455/63.4; 455/66.1; 455/67.11; 455/562.1; 455/267.1; 455/295

(58) Field of Classification Search ................. 455/63.4, 455/66.1, 67.11, 562.1, 276.1, 295–296, 455/303, 306–307; 375/324, 148; 342/378, 342/383
See application file for complete search history.

(56) References Cited

U.S. PATENT DOCUMENTS

| | | | | |
|---|---|---|---|---|
| 5,280,472 A | * | 1/1994 | Gilhousen et al. | 370/335 |
| 5,893,033 A | * | 4/1999 | Keskitalo et al. | 455/437 |
| 6,064,338 A | * | 5/2000 | Kobayakawa et al. | 342/378 |
| 6,347,234 B1 | * | 2/2002 | Scherzer | 455/562.1 |
| 6,466,166 B2 | | 10/2002 | Nakagawa | |
| 6,757,527 B1 | * | 6/2004 | Dahlback et al. | 455/255 |
| 6,804,215 B1 | * | 10/2004 | Tanoue | 370/335 |
| 6,904,076 B1 | * | 6/2005 | Tsutsui et al. | 375/130 |
| 7,062,294 B1 | * | 6/2006 | Rogard et al. | 455/562.1 |
| 7,263,083 B2 | * | 8/2007 | Kisigami et al. | 370/335 |
| 7,319,683 B2 | * | 1/2008 | Doi et al. | 370/334 |
| 7,548,735 B1 | * | 6/2009 | Sullivan et al. | 455/130 |
| 7,558,350 B2 | * | 7/2009 | Kimata | 375/347 |
| 2001/0028675 A1 | * | 10/2001 | Bierly et al. | 375/143 |
| 2001/0031022 A1 | | 10/2001 | Petrus et al. | |
| 2002/0045432 A1 | * | 4/2002 | Yoshida | 455/276.1 |
| 2003/0012267 A1 | | 1/2003 | Jitsukawa et al. | |
| 2003/0186725 A1 | | 10/2003 | Miya et al. | |
| 2003/0228887 A1 | * | 12/2003 | Kishigami et al. | 455/561 |

(Continued)

FOREIGN PATENT DOCUMENTS

| | | |
|---|---|---|
| EP | 0938204 | 8/1999 |
| EP | 1077504 | 2/2001 |
| JP | 11-046180 | 2/1999 |

OTHER PUBLICATIONS

Patent Abstracts of Japan, Publication No. 2002-300086, Published Oct. 11, 2002.

(Continued)

Primary Examiner — Edward Urban
Assistant Examiner — Ganiyu Hanidu
(74) Attorney, Agent, or Firm — Staas & Halsey LLP

(57) ABSTRACT

A wireless communication device which permits reduction in the scale of circuitry as well as in the power consumption. The wireless communication device includes an array of antennas, an adaptive array searcher, and a data demodulator. The adaptive array searcher detects the phase difference between the antennas and estimates the direction of arrival of received radio waves. The data demodulator demodulates the radio signal received by the antennas. The adaptive array searcher shares part of circuitry with a calibrator which performs calibration by correcting the phase difference caused between antenna channels in the wireless communication device, and thus has a calibration function incorporated therein.

3 Claims, 7 Drawing Sheets

U.S. PATENT DOCUMENTS

| | | | |
|---|---|---|---|
| 2005/0113042 A1 | 5/2005 | Felter | |
| 2005/0147064 A1* | 7/2005 | Nakagawa | 370/335 |
| 2006/0279459 A1* | 12/2006 | Akiyama et al. | 342/372 |
| 2007/0225042 A1* | 9/2007 | Kitahara | 455/562.1 |

OTHER PUBLICATIONS

Patent Abstracts of Japan, Publication No. 2003-283404, Published Oct. 3, 2003.

"On-line RF Circuitry Calibration Employing Exclusive Calibration Signal for Adaptive Antenna Array Transmit Diversity", Technical Report of IEICE, RCS2002-177, Oct. 2002, pp. 31-36.

European Search Report dated May 20, 2009 in corresponding European Application No. 07101451.8.

Japanese Office Action dated Mar. 8, 2011 in Appln. No. 2006-266178.

* cited by examiner

WIRELESS COMMUNICATION DEVICE

CROSS-REFERENCE TO RELATED APPLICATIONS

This application is based upon and claims the benefits of priority from the prior Japanese Patent Application No. 2006-266178 filed Sep. 29, 2006, the entire contents of which are incorporated herein by reference.

BACKGROUND OF THE INVENTION

1. Field of the Invention

The present invention relates to wireless communication devices, and more particularly, to a wireless communication device using an adaptive array antenna to perform wireless communication.

2. Description of the Related Art

Development of digital cellular wireless communication systems using DS-CDMA (Direct Spread Code Division Multiple Access) technology has been actively pursued since such systems are considered next-generation mobile communication systems enabling wireless multimedia communications.

In ordinary wireless communication systems, an adaptive array antenna system has been introduced in anticipation of increase in the subscriber capacity or expansion of the cell radius. The adaptive array antenna system is a system wherein a plurality of antennas are arrayed so that their directivities can be dynamically varied in response to changes in the electromagnetic environment.

FIG. 7 illustrates a schematic configuration of an adaptive array antenna system. The illustrated adaptive array antenna system is a model showing a basic receiving operation thereof and only the elements necessary for explaining the system are shown in the figure.

The adaptive array antenna system 10 includes antenna branches 10-1 to 10-4 and a data demodulator 1c. The antenna branches 10-1 to 10-4 respectively comprise antennas 1-1 to 1-4, analog amplifiers 10b-1 to 10b-4, and A/D converters 10c-1 to 10c-4. The data demodulator 1c comprises multipliers 11-1 to 11-4, an adder 12, and a weighting factor setting unit 1c-1.

The antennas 1-1 to 1-4 receive radio signals, which are then amplified by the analog amplifiers 10b-1 to 10b-4, respectively, and the A/D converters 10c-1 to 10c-4 convert the respective amplified analog signals to digital signals d1 to d4 (other elements in the individual branches, such as frequency converters, are omitted from the figure).

The weighting factor setting unit 1c-1 determines weighting factors in accordance with setting information A, and the multipliers 11-1 to 11-4 respectively multiply the output signals d1 to d4 from the A/D converters 10c-1 to 10c-4 by the weighting factors W1 to W4 set by the weighting factor setting unit 1c-1. The adder 12 adds up the four weighted signals and outputs the resulting signal.

Suppose the antennas 1-1 to 1-4 receive a radio signal with an arrival angle φ. In this case, if the phase plane is set using the antenna 1-1 as a reference antenna, the antennas 1-2 to 1-4 receive the radio signal with phase differences λ, 2λ, and 3λ, respectively, because of path differences (the phase difference between adjacent antennas is λ).

For the multiplier 11-2 connected to the antenna 1-2, the weighting factor setting unit 1c-1 generates a weighting factor W2 for rotating the phase by λ and sends the factor W2 to the multiplier 11-2, so that the multiplier 11-2 multiplies the signal d2 by the weighting factor W2 to correct the phase difference λ. Also, for the multiplier 11-3 connected to the antenna 1-3, the weighting factor setting unit 1c-1 generates a weighting factor W3 for rotating the phase by 2λ and sends the factor W3 to the multiplier 11-3. Thus, the multiplier 11-3 multiplies the signal d3 by the weighting factor W3 to correct the phase difference 2λ. Further, for the multiplier 11-4 connected to the antenna 1-4, the weighting factor setting unit 1c-1 generates a weighting factor W4 for rotating the phase by 3λ and sends the factor W4 to the multiplier 11-4, whereupon the multiplier 11-4 multiplies the signal d4 by the weighting factor W4 to correct the phase difference 3λ.

The multiplications using the respective weighting factors make it possible to cancel out all phase differences λ between the antennas 1-1 to 1-4, allowing the multipliers 11-1 to 11-4 to output signals which are in phase with each other. The adder 12 adds up the in-phase signals, so that signal reception with high gain can be performed.

After reaching the antennas 1-1 to 1-4, the radio signal is subjected to analog amplification, A/D conversion, etc., as mentioned above. Nonlinear circuit elements for performing these functions have individually different characteristics, and the characteristics also vary in response to changes in temperature or other environmental conditions as well as with the lapse of time. Therefore, the phase characteristics (phase rotations) of the antenna branches 10-1 to 10-4 are not exactly the same but differ from one to another.

Consequently, the antenna branches 10-1 to 10-4 involve their own phase shifts, and if these phase shifts are not removed, the phase differences cannot be completely canceled out, making it impossible to perform the in-phase addition with accuracy.

It is therefore necessary to carry out calibration for detecting and removing variations in the phase characteristic among the antenna branches in the system. A circuit for performing such calibration is called calibrator. The calibrator corrects the phase shifts of the individual antenna branches, whereby the antenna outputs can be weighted with accuracy in the data demodulator 1c.

As conventional adaptive array antenna techniques, a technique has been proposed in which beamforming is carried out to generate delay profiles for a plurality of beams and a path is detected based on the delay profiles, whereby the scale of circuitry is minimized even in cases where the number of antenna elements is increased (e.g., Unexamined Japanese Patent Publication No. 2003-283404 (paragraph nos. [0022] to [0029], FIG. 1)).

In adaptive array antenna systems, beamforming is carried out with the beam directivity of the array antenna adaptively controlled such that a narrow beam is directed to a desired station for communication.

When signal is transmitted from a base station equipped with an adaptive array antenna to a terminal, the base station carries out DL (Down Link) beamforming in such a manner that the beam directivity is highest in the DoA (Direction of Arrival) which is estimated from the UL (Up Link) signal transmitted from the terminal. A circuit for estimating the arrival direction (arrival angle) at the time of DL beamforming is called adaptive array searcher.

Thus, adaptive array antenna systems are provided with the calibrator function and the adaptive array searcher function. In conventional systems, however, the calibrator circuit and the adaptive array searcher circuit are mounted separately, though they include equivalent functional blocks that can be shared, and the equivalent circuit elements are operated at the same time, giving rise to the problem that the scale of the circuitry as well as the power consumption increase.

SUMMARY OF THE INVENTION

The present invention was created in view of the above circumstances, and an object thereof is to provide a wireless communication device in which functional blocks common to both of a calibrator and an adaptive array searcher are shared by the two, thus permitting reduction in the scale of circuitry as well as in the power consumption.

To achieve the object, there is provided a wireless communication device using an adaptive array antenna to perform wireless communication. The wireless communication device comprises an array of antennas, and an adaptive array searcher for detecting a phase difference between the antennas and estimating a direction of arrival of received radio waves, wherein the adaptive array searcher shares part of circuitry with a calibrator which performs calibration by correcting a phase difference caused between antenna channels in the wireless communication device.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
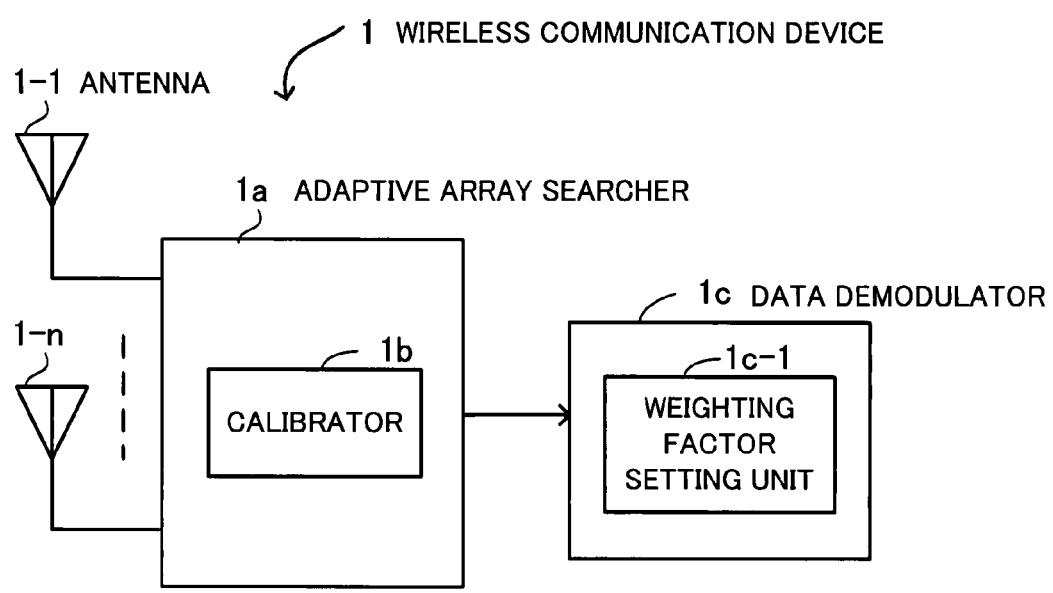
FIG. 1 illustrates the principle of a wireless communication device.

Preferred embodiments of the present invention will be described below with reference to the accompanying drawings, wherein like reference numerals refer to like elements throughout. FIG. 1 illustrates the principle of a wireless communication device. The wireless communication device 1 comprises an array of antennas 1-1 to 1-$n$, an adaptive array searcher 1$a$, and a data demodulator 1$c$.

The adaptive array searcher 1$a$ detects the phase difference between the antennas 1-1 to 1-$n$ and estimates the direction of arrival of received radio waves. The data demodulator 1$c$ includes a weighting factor setting unit 1$c$-1. The weighting factor setting unit 1$c$-1 sets weighting factors for weighting the outputs of the respective antennas 1-1 to 1-$n$ so that the data demodulator 1$c$ can demodulate received data (user data) received by the antennas 1-1 to 1-$n$.

The adaptive array searcher 1$a$ shares part of circuitry with a calibrator 1$b$ which performs calibration by correcting the phase difference caused between antenna channels (identical in meaning to the aforementioned antenna branches) in the wireless communication device. Thus, the adaptive array searcher 1$a$ has a calibration function incorporated therein (details of the circuit configuration will be described later with reference to FIG. 4).

Figure 2:
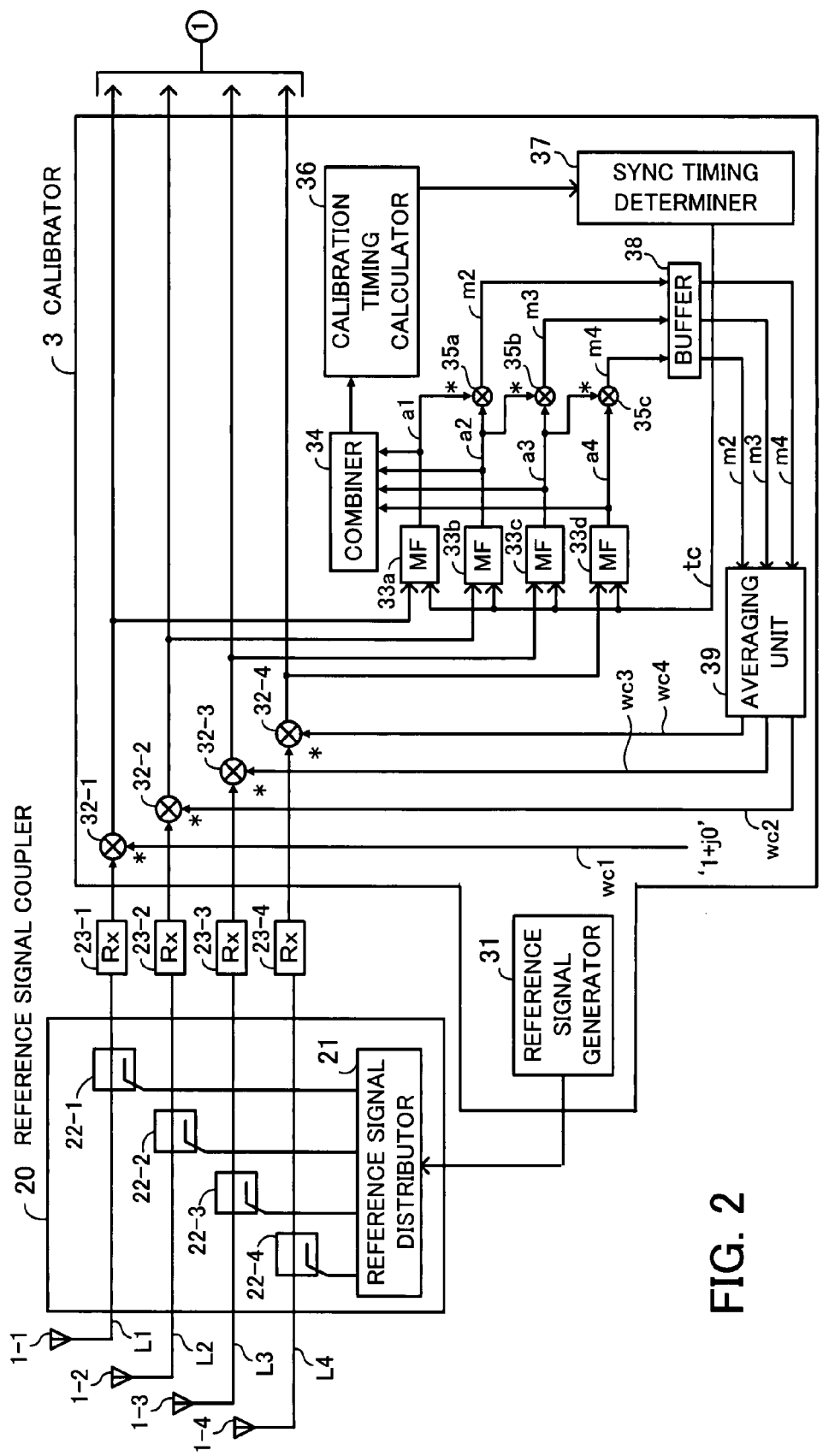
FIG. 2 shows the circuit configuration of a calibrator and its peripheral elements.

The following describes the circuit configuration and operation of the calibrator as a self-contained functional unit. FIG. 2 shows the circuit configuration of the calibrator and its peripheral elements. The calibrator 3 is connected with a reference signal coupler 20 through receivers 23-1 to 23-4. The reference signal coupler 20 comprises a reference signal distributor (power divider) 21 and directional couplers 22-1 to 22-4.

The calibrator 3 comprises a reference signal generator 31, multipliers 32-1 to 32-4, matched filters 33$a$ to 33$d$, a combiner 34, multipliers 35$a$ to 35$c$, a calibration timing calculator 36, a synchronization timing determiner 37, a buffer 38, and an averaging unit 39.

The reference signal generator 31 outputs a reference signal which is used as a basis for performing calibration. For the reference signal, a spread signal (PN (Pseudo Noise) code) is used. The reference signal distributor 21 divides the power of the received reference signal into four reference signals, which are sent to the respective directional couplers 22-1 to 22-4.

The directional coupler 22-1 allows the reference signal to be introduced to a line L1 connected to the antenna 1-1 and outputs the reference signal to the receiver 23-1. Similarly, the directional couplers 22-2 to 22-4 allow the reference signals to enter lines L2 to L4 connected to the antennas 1-2 to 1-4, respectively, and output the reference signals to the respective receivers 23-2 to 23-4.

The reference signal input to each of the directional couplers 22-1 to 22-4 is a spread signal and, therefore, is only a very small noise for the radio signal received by the antennas 1-1 to 1-4. Accordingly, the reference signal, if coupled with the radio signal from the antennas 1-1 to 1-4 by the directional couplers 22-1 to 22-4, does not affect the subsequent process, permitting calibration to be performed during the operation.

The receivers 23-1 to 23-4 receive the reference signals and send the received signals to the respective multipliers 32-1 to 32-4. The output signal from each of the multipliers 32-1 to 32-4 is split into two, one being sent to the adaptive array searcher shown in FIG. 3 and the other to a corresponding one of the matched filters 33$a$ to 33$d$.

In response to a calibration timing signal tc output from the synchronization timing determiner 37, the matched filters 33$a$ to 33$d$ acquire synchronization between the reference signals of the respective antenna channels and the known reference signal pattern, and output demodulated signals (reference signal delay profiles) a1 to a4, respectively. The combiner 34 combines the demodulated signals a1 to a4 and provides a composite signal as its output.

On receiving the composite signal, the calibration timing calculator 36 calculates a timing (corresponding to despreading timing for the reference signal) at which the power of the composite signal is highest (at its peak) within a fixed interval. When supplied with the timing calculated by the calibration timing calculator 36, the synchronization timing determiner 37 generates a calibration timing signal tc for determining the reference signal with a timing that has the highest peak among the reference signal delay profiles, and sends the signal tc to the matched filters 33$a$ to 33$d$ for the purpose of symbol synchronization of the reference signals.

The multiplier 35$a$ multiplies the demodulated signals a1 and a2 together to obtain a product signal m2 indicative of a phase difference between the phase characteristics of the channels of the antennas 1-1 and 1-2, and sends the signal m2 to the buffer 38. The multiplier 35$b$ multiplies the demodulated signals a2 and a3 together to obtain a product signal m3 indicative of a phase difference between the phase characteristics of the channels of the antennas 1-2 and 1-3, and sends the signal m3 to the buffer 38. The multiplier 35c multiplies the demodulated signals a3 and a4 together to obtain a product signal m4 indicative of a phase difference between the phase characteristics of the channels of the antennas 1-3 and 1-4, and sends the signal m4 to the buffer 38.

The averaging unit 39 averages the product signals m2 to m4 supplied thereto via the buffer 38, and generates weighting factors wc2 to wc4 for calibration. The weighting factors wc2, wc3 and wc4 are sent to the multipliers 32-2, 32-3 and 32-4, respectively.

The multiplier 32-2 multiplies the user data by the weighting factor wc2, to correct the phase difference caused by the circuit elements in the channel of the antenna 1-2. The multiplier 32-3 multiplies the user data by the weighting factor wc3, to correct the phase difference caused by the circuit elements in the channel of the antenna 1-3. The multiplier 32-4 multiplies the user data by the weighting factor wc4, to correct the phase difference caused by the circuit elements in the channel of the antenna 1-4.

In the illustrated example, the phase of the antenna channel 1-1 is used as a reference phase. Specifically, the phases of the antennas 1-2 to 1-4 are made to coincide with that of the antenna 1-1, to thereby remove the phase difference between the antenna channels. Accordingly, the multiplier 32-1 is not applied with a weighting factor wc1 for phase difference correction (no phase rotation is given with respect to the antenna 1-1).

Figure 3:
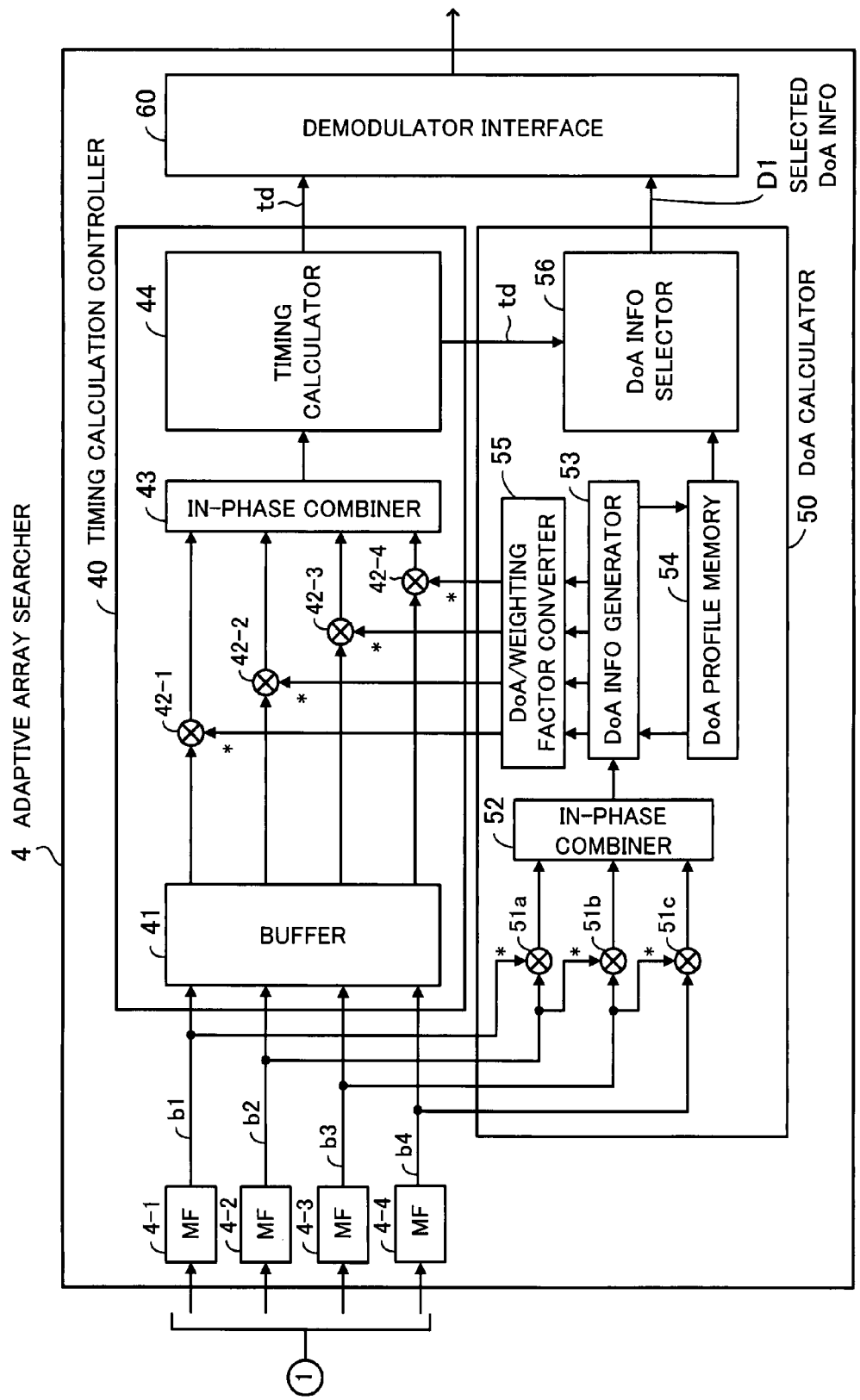
FIG. 3 shows the circuit configuration of an adaptive array searcher.

The following describes the circuit configuration and operation of the adaptive array searcher as a self-contained functional unit. FIG. 3 shows the circuit configuration of the adaptive array searcher. The adaptive array searcher 4 comprises matched filters 4-1 to 4-4, a timing calculation controller 40, a DoA (Direction of Arrival) calculator 50, and a demodulator interface 60.

The timing calculation controller 40 includes a buffer 41, multipliers 42-1 to 42-4, an in-phase combiner 43, and a timing calculator 44. The DoA calculator 50 includes multipliers 51a to 51c, an in-phase combiner 52, a DoA information generator 53, a DoA profile memory 54, a DoA/weighting factor converter 55, and a DoA information selector 56.

The adaptive array searcher 4 is supplied with the user data of which the phase difference between the antenna channels has been canceled out by the preceding calibrator 3; therefore, the adaptive array searcher 4 may simply estimate the DoA based on the phase difference actually caused between the antennas. In order to estimate the DoA, the phase difference between the antennas has only to be detected (in FIG. 7, for example, detecting the phase difference $\lambda$ between the antennas is equivalent to estimating the arrival direction (arrival angle $\phi$)).

By matching the received user data against the known data pattern, the matched filters 4-1 to 4-4 calculate instantaneous values of user data delay profiles, to generate user data-demodulated signals b1 to b4. The demodulated signals b1 to b4 are each split into two, one being sent to the buffer 41 in the timing calculation controller 40 and the other being sent to a corresponding one of the multipliers 51a to 51c in the DoA calculator 50.

The multiplier 51a multiplies the demodulated signals b1 and b2 together and outputs the phase difference $\lambda 1$ between the antennas 1-1 and 1-2. The multiplier 51b multiplies the demodulated signals b2 and b3 together and outputs the phase difference $\lambda 2$ between the antennas 1-2 and 1-3. The multiplier 51c multiplies the demodulated signals b3 and b4 together and outputs the phase difference $\lambda 3$ between the antennas 1-3 and 1-4.

The in-phase combiner 52 combines the phase differences $\lambda 1$ to $\lambda 3$ in phase with each other and outputs a single phase difference signal. The three phase differences $\lambda 1$ to $\lambda 3$ between adjacent antennas ideally assume the same value $\lambda$. In practice, however, the phase differences involve error because of noise or the like, and therefore, the phase differences are combined by the in-phase combiner 52 into a single phase difference signal.

The DoA information generator 53 averages n phase difference signals ($\lambda_1$ to $\lambda_n$) derived in one symbol interval, to generate DoA information corresponding to one symbol of the received data. The DoA profile memory 54 stores the DoA information. The DoA/weighting factor converter 55 converts the DoA information to weighting factors.

The buffer 41 stores the demodulated signals b1 to b4 demodulated by the matched filters 4-1 to 4-4. The demodulated signals b1 to b4 are read from the buffer 41 after the DoA information corresponding to the demodulated signals b1 to b4 is created and then stored in the DoA profile memory 54. The multipliers 42-1 to 42-4 respectively multiply the signals output from the buffer 41 by the weighting factors received from the DoA/weighting factor converter 55 and output the resulting product signals. The in-phase combiner 43 combines the product signals in phase with each other and outputs a composite signal. The timing calculator 44 detects the timing (corresponding to despreading timing for the user data) at which the power of the composite signal is at its peak, and supplies the resulting user data timing signal td to the demodulator interface 60 and the DoA information selector 56.

The DoA information selector 56 selects DoA information matching the timing of the user data timing signal td, from among the DoA information received from the DoA profile memory 54, and sends the selected DoA information D1 to the demodulator interface 60. On receiving the user data timing signal td and the selected DoA information D1 (more specifically, information showing the phase difference $\lambda$ between the antennas), the demodulator interface 60 sends the signal td and the information D1 to the succeeding data demodulator 1c shown in FIG. 1. Since the user data timing signal td shows the despreading timing for the user data, the data demodulator 1c can demodulate the received user data at that timing. Also, the weighting factor setting unit 1c-1 can calculate weighting factors based on the selected DoA information D1 ($\lambda$).

Figure 4:
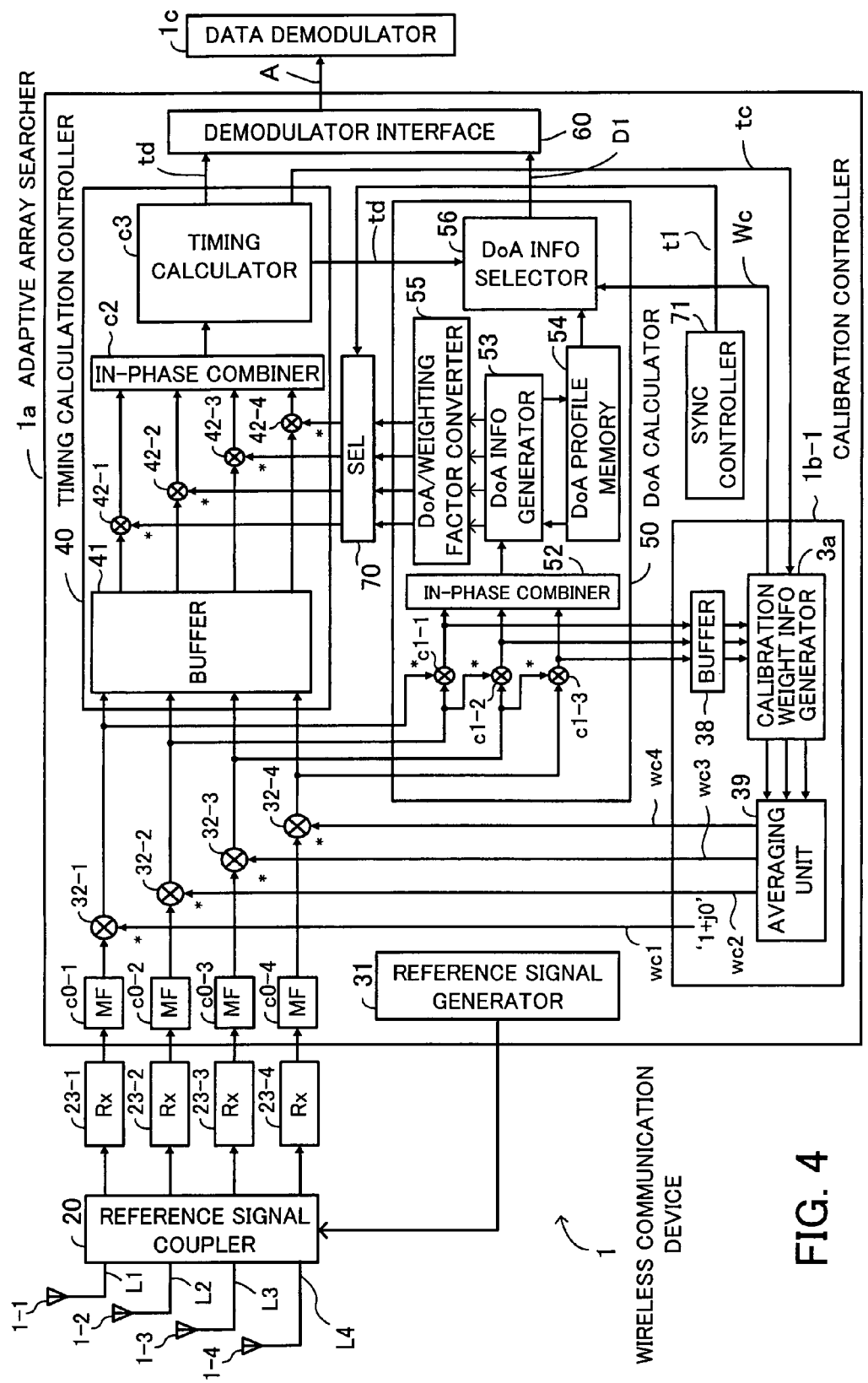
FIG. 4 shows the circuit configuration of the wireless communication device.

The following describes the circuit configuration and operation of the wireless communication device 1 of the present invention in which the calibrator 3 shown in FIG. 2 is incorporated into the adaptive array searcher 4 shown in FIG. 3. FIG. 4 shows the circuit configuration of the wireless communication device 1.

The wireless communication device 1 includes antennas 1-1 to 1-4, a reference signal coupler 20, receivers 23-1 to 23-4, an adaptive array searcher 1a, and a data demodulator 1c. The adaptive array searcher 1a comprises a reference signal generator 31, matched filters c0-1 to c0-4, multipliers 32-1 to 32-4, a timing calculation controller 40, a DoA calculator 50, a demodulator interface 60, a selector 70, a synchronization controller 71, and a calibration controller 1b-1.

The timing calculation controller 40 is made up of a buffer 41, multipliers 42-1 to 42-4, an in-phase combiner c2, and a timing calculator c3. The DoA calculator 50 is constituted by multipliers c1-1 to c1-3, an in-phase combiner 52, a DoA information generator 53, a DoA profile memory 54, a DoA/ weighting factor converter 55, and a DoA information selector 56. The calibration controller 1b-1 comprises a calibration weight information generator 3a, a buffer 38, and an averaging unit 39.

Main circuit blocks that are shared by the calibrator 3 shown in FIG. 2 and the adaptive array searcher 4 shown in FIG. 3 are the matched filters c0-1 to c0-4, the multipliers c1-1 to c1-3 (phase difference detector), the in-phase combiner c2, and the timing calculator c3.

Calibration of the wireless communication device 1 will be now described. The reference signal generator 31 outputs a reference signal (spread signal) which is used as a basis for performing the calibration. The reference signal coupler 20 divides the power of the received reference signal into four reference signals corresponding in number to the antennas 1-1 to 1-4, and causes the reference signals to enter respective lines L1 to L4 by means of directional couplers included therein.

The receivers 23-1 to 23-4 receive the reference signals and send the received signals to the matched filters c0-1 to c0-4, respectively. The matched filters c0-1 to c0-4 acquire synchronization between the reference signals of the respective antenna channels and the known reference signal pattern, to generate demodulated reference signals (reference signal delay profiles), which are sent to the respective multipliers 32-1 to 32-4. The output signals from the multipliers 32-1 to 32-4 are each split into two, one being sent to the buffer 41 of the timing calculation controller 40 and the other being sent to a corresponding one of the multipliers c1-1 to c1-3 in the DoA calculator 50.

The signals output to the buffer 41 from the multipliers 32-1 to 32-4 are then sent via the multipliers 42-1 to 42-4 to the in-phase combiner c2. The in-phase combiner c2 combines the demodulated reference signals and outputs the resulting composite signal.

When supplied with the composite signal, the timing calculator c3 calculates the timing (corresponding to despreading timing for the reference signal) at which the power of the composite signal is highest (at its peak) in a fixed interval, and sends the resulting reference timing signal tc to the calibration weight information generator 3a.

On the other hand, the multiplier c1-1 multiplies the demodulated reference signals output from the multipliers 32-1 and 32-2, and sends the resulting product signal, which indicates the phase difference between the phase characteristic of the channels of the antennas 1-1 and 1-2, to the buffer 38. The multiplier c1-2 multiplies the demodulated reference signals output from the multipliers 32-2 and 32-3, and sends the resulting product signal, which indicates the phase difference between the phase characteristics of the channels of the antennas 1-2 and 1-3, to the buffer 38. The multiplier c1-3 multiplies the demodulated reference signals output from the multipliers 32-3 and 32-4, and sends the resulting product signal, which indicates the phase difference between the phase characteristics of the channels of the antennas 1-3 and 1-4, to the buffer 38.

In response to the reference timing signal tc output from the timing calculator c3, the calibration weight information generator 3a generates calibration weight information (calibration weighting factor Wc) on the basis of the received product signals, and sends the generated information to the DoA information selector 56. Also, in response to the reference timing signal tc, the calibration weight information generator 3a sends the product signals received from the buffer 38 to the averaging unit 39.

On receiving the product signals sent from the calibration weight information generator 3a in response to the reference timing signal tc, the averaging unit 39 averages the product signals and generates calibration weighting factors wc2 to wc4. The weighting factor wc2 is sent to the multiplier 32-2, the weighting factor wc3 to the multiplier 32-3, and the weighting factor wc4 to the multiplier 32-4.

The multiplier 32-2 multiplies the user data by the weighting factor wc2 to correct the phase difference caused by the circuit elements in the channel of the antenna 1-2. The multiplier 32-3 multiplies the user data by the weighting factor wc3 to correct the phase difference caused by the circuit elements in the channel of the antenna 1-3. The multiplier 32-4 multiplies the user data by the weighting factor wc4 to correct the phase difference caused by the circuit elements in the channel of the antenna 1-4.

In the illustrated example, the phase of the antenna channel 1-1 is used as a reference phase. Specifically, the phases of the antenna channels 1-2 to 1-4 are made to coincide with that of the antenna channel 1-1, to thereby remove the phase difference between the antenna channels. Accordingly, the multiplier 32-1 is not applied with a weighting factor for phase difference correction.

DoA estimation by the wireless communication device 1 will be now described. The receivers 23-1 to 23-4 subject the radio signals received by the antennas 1-1 to 1-4 to amplification, down-conversion, etc., and supply the resulting signals to the respective matched filters c0-1 to c0-4 as user data.

By matching the user data against the known data pattern, the matched filters c0-1 to c0-4 calculate instantaneous values of user data delay profiles, to generate user data-demodulated signals (demodulated user signals). The demodulated user signals are sent to the respective multipliers 32-1 to 32-4 and are each split into two at the output stage of same, one being sent to the buffer 41 in the timing calculation controller 40 and the other being sent to a corresponding one of the multipliers c1-1 to c1-3 in the DoA calculator 50.

The multiplier c1-1 multiplies the demodulated user signals output from the multipliers 32-1 and 32-2, and outputs the phase difference $\lambda 1$ between the antennas 1-1 and 1-2. The multiplier c1-2 multiplies the demodulated user signals output from the multipliers 32-2 and 32-3, and outputs the phase difference $\lambda 2$ between the antennas 1-2 and 1-3. The multiplier c1-3 multiplies the demodulated user signals output from the multipliers 32-3 and 32-4, and outputs the phase difference $\lambda 3$ between the antennas 1-3 and 1-4.

The in-phase combiner 52 combines the phase differences $\lambda 1$ to $\lambda 3$ in phase with each other and outputs a single phase difference signal. The three phase differences $\lambda 1$ to $\lambda 3$ ideally assume the same value $\lambda$. In practice, however, the phase differences involve error because of noise or the like, and therefore, the phase differences are combined by the in-phase combiner 52 into a single phase difference signal.

The DoA information generator 53 averages the phase difference signals derived in one symbol interval and generates multiple items of DoA information corresponding to one symbol interval of the received data. The DoA profile memory 54 stores the DoA information. The DoA/weighting factor converter 55 converts the DoA information to weighting factors.

The buffer 41 stores the demodulated user signals demodulated by the matched filters c0-1 to c0-4. The demodulated user signals are output from the buffer 41 after the DoA information corresponding to the demodulated user signals is generated and then stored in the DoA profile memory 54.

The synchronization controller 71 (which may be implemented by the synchronization timing determiner 37 of the calibrator 3) generates, in response to an external signal, not shown, transmitted thereto from a host, a synchronization timing signal t1 for switching operation between the calibration and the DoA estimation, and sends the generated signal t1 to the selector 70. On receiving the synchronization timing signal t1 from the synchronization controller 71, the selector 70 sends the weighting factors, received from the DoA/weighting factor converter 55, to the multipliers 42-1 to 42-4.

The multipliers 42-1 to 42-4 respectively multiply the signals output from the buffer 41 by the weighting factors received from the DoA/weighting factor converter 55 via the selector 70, and output the resulting product signals. The in-phase combiner c2 combines the product signals in phase with each other and outputs a composite signal. The timing calculator c3 detects the timing (corresponding to despreading timing for the user data) at which the power of the composite signal is at its peak, and supplies the detected timing, as the user data timing signal td, to the demodulator interface 60 and the DoA information selector 56.

The DoA information selector 56 selects DoA information matching the timing of the user data timing signal td, from among the DoA information received from the DoA profile memory 54, and sends the selected DoA information D1 to the demodulator interface 60. On receiving the user data timing signal td and the selected DoA information D1 (more specifically, information showing the phase difference λ between the antennas), the demodulator interface 60 generates setting information A (the contents of the setting information A will be described later with reference to FIGS. 5 and 6), and sends the generated information A to the data demodulator 1c. Since the user data timing signal td shows the despreading timing for the user data, the data demodulator 1c can demodulate the received user data at that timing. Also, the weighting factor setting unit 1c-1 can calculate weighting factors based on the selected DoA information D1 (λ).

Although not shown in FIG. 4, the data demodulator 1c also receives the user data (corresponding to the signals d1 to d4 in FIG. 7) output from the receivers 23-1 to 23-4. In accordance with the setting information A, the weighting factor setting unit 1c-1 in the data demodulator 1c weights the user data, namely, the antenna outputs.

Figure 5:
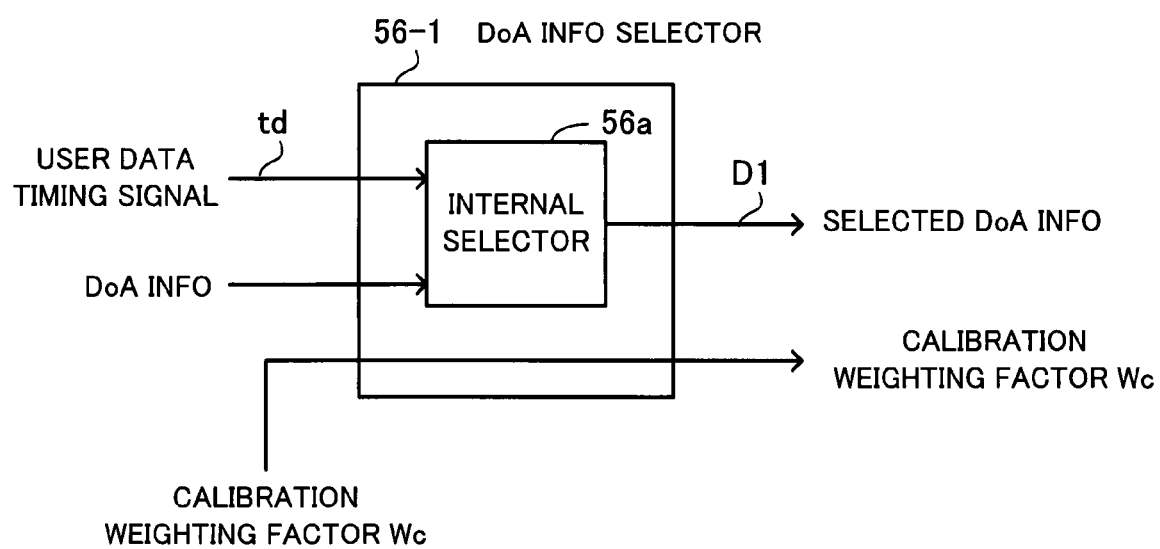
FIG. 5 shows the configuration of a DoA information selector.

The configuration of the DoA information selector 56 will be now described with reference to FIG. 5. As shown in the figure, the DoA information selector 56-1 includes an internal selector 56a. The internal selector 56a receives the user data timing signal (despreading timing information for the user data) td output from the timing calculator c3 as well as the DoA information output from the DoA profile memory 54, and sends the DoA information matching the timing of the user data timing signal td to the demodulator interface 60 as the selected DoA information D1. Also, the DoA information selector receives the calibration weighting factor Wc output from the calibration weight information generator 3a and passes same through to the demodulator interface 60.

Figure 7:
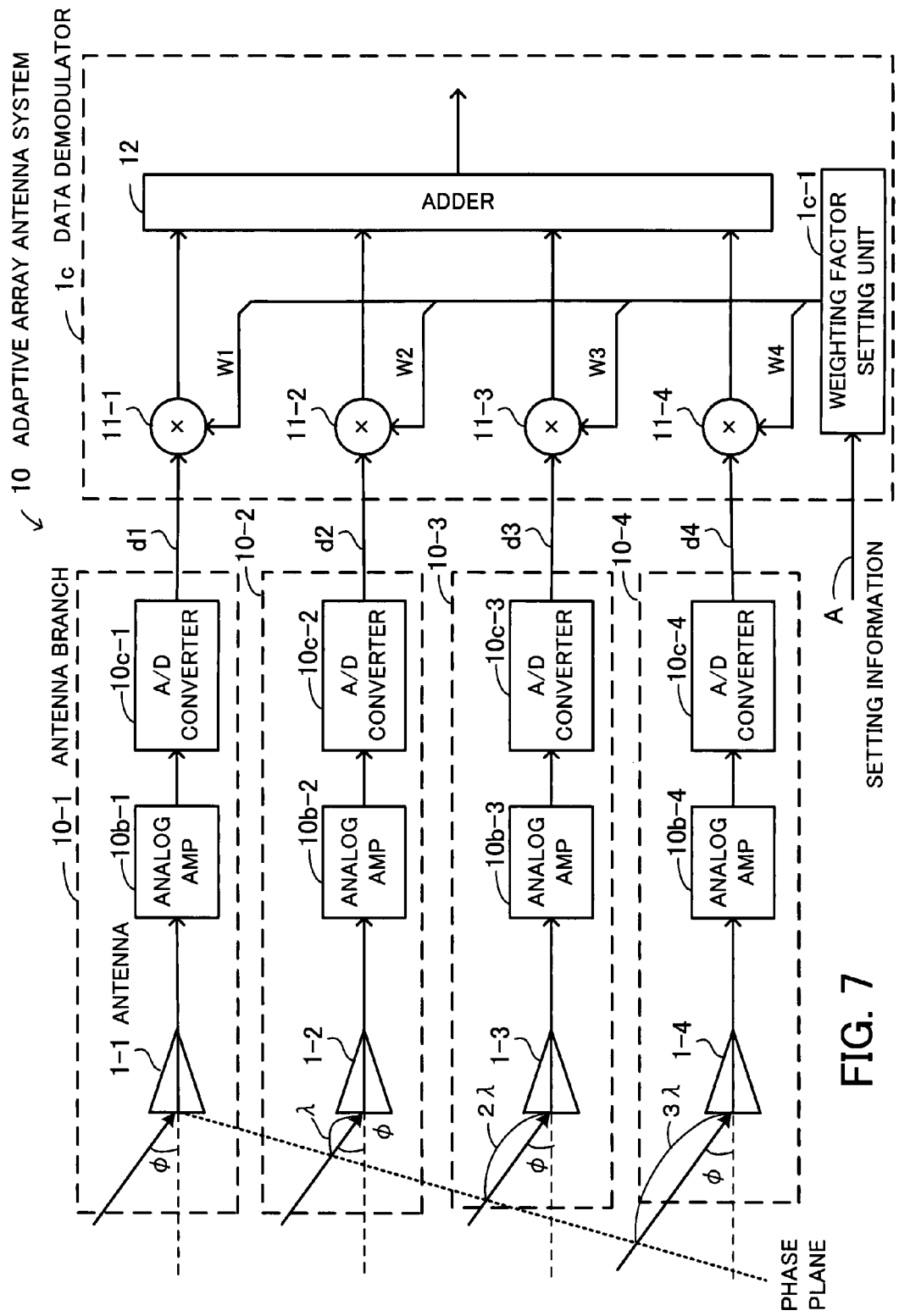
FIG. 7 shows a schematic configuration of an adaptive array antenna system.

On receiving the setting information A (selected DoA information D1+calibration weighting factor Wc) via the demodulator interface 60, the weighting factor setting unit 1c-1 in the data demodulator 1c calculates weighting factors W1 to W4 for correcting the phase difference between the antennas 1-1 to 1-4, as shown in FIG. 7, and sends the weighting factors W1 to W4 to the respective multipliers 11-1 to 11-4 to correct the phase difference between the antennas.

Figure 6:
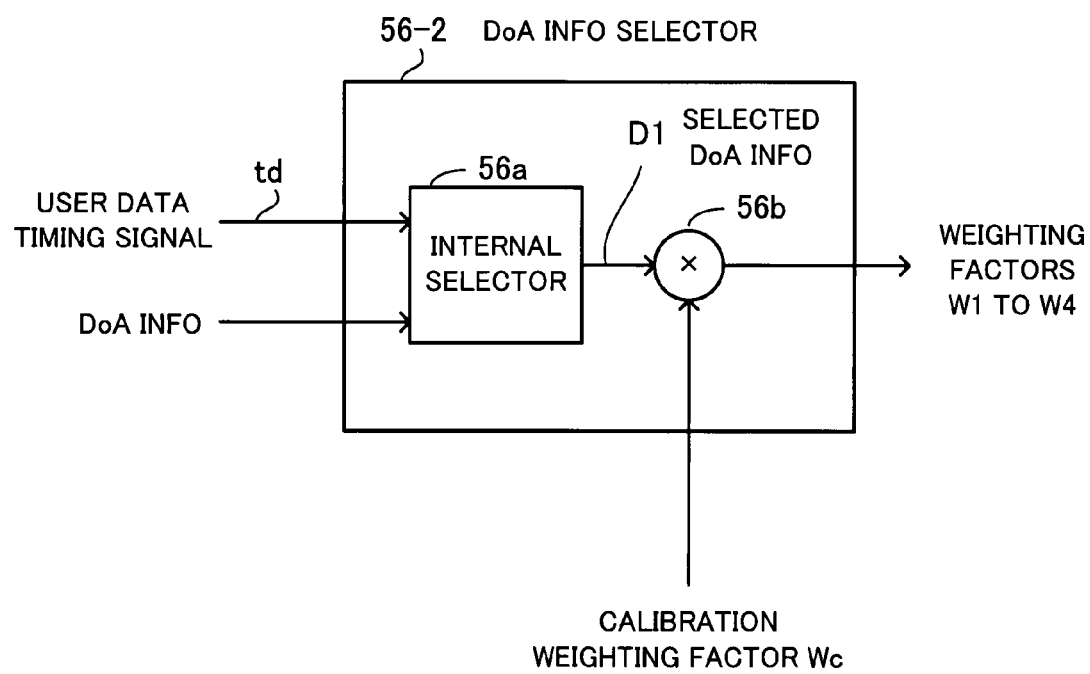
FIG. 6 shows the configuration of another DoA information selector.

FIG. 6 shows the configuration of another DoA information selector. The DoA information selector 56-2 includes an internal selector 56a and a multiplier 56b. The internal selector 56a receives the user data timing signal (despreading timing information for the user data) td output from the timing calculator c3 as well as the DoA information output from the DoA profile memory 54, and outputs, as the selected DoA information D1, the DoA information matching the timing of the user data timing signal.

The multiplier 56b multiplies the selected DoA information D1 by the calibration weighting factor Wc output from the calibration weight information generator 3a to generate weighting factors W1 to W4 for correcting the post-calibration phase difference between the antennas, and sends the calculated weighting factors to the demodulator interface 60.

On receiving the weighting factors W1 to W4 as the setting information A via the demodulator interface 60, the weighting factor setting unit 1c-1 in the data demodulator 1c sends the weighting factors W1 to W4 to the respective multipliers 11-1 to 11-4, as shown in FIG. 7, to correct the phase difference between the antennas 1-1 to 1-4. In this manner, the wireless communication device may be configured such that up to the calculation of the weighting factors for correcting the phase difference between the antennas 1-1 to 1-4 is performed by the adaptive array searcher 1a and that only the calculation results are sent to the data demodulator 1c.

In the wireless communication device of the present invention, the adaptive array searcher for estimating the direction of arrival of received radio waves shares part of circuitry with the calibrator for correcting the phase difference caused between the antenna channels in the wireless communication device and thus has a calibration function incorporated therein. Since the calibrator and the adaptive array searcher share equivalent functional blocks, the scale of the circuitry as well as the power consumption can be cut down.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless communication device using an adaptive array antenna to perform wireless communication, comprising:
    an array of antennas to receive a plurality of radio waves;
    a reference signal generator to generate a reference signal;
    a reference signal coupler, coupled to the array of antennas, to combine the reference signal with received radio wave signals of the individual antennas;
    a plurality of matched filters, coupled to the reference signal coupler, to demodulate the received radio wave signals and the reference signals combined therewith;
    a plurality of first multipliers, coupled to outputs of the matched filters, to multiply the demodulated radio wave signals and demodulated reference signals by a plurality of first weighting coefficients, respectively;
    a plurality of second multipliers, coupled to the first multipliers in series, to further multiply the demodulated radio wave signals and demodulated reference signals by a plurality of second weighting coefficients, respectively;
    a calibrator, coupled to the matched filters via the first multipliers, to detect first phase differences between the demodulated reference signals, and provide the first multipliers with the first weighting coefficients calculated from the detected first phase differences, so as to correct different phase characteristics of circuitry that processes the received radio wave signals; and
    an adaptive array searcher, coupled to the second multipliers, to detect second phase differences between the demodulated radio wave signals, estimate a direction of arrival of the received radio waves from the detected second phase differences, and provide the second multipliers with the second weighting coefficients calculated from the estimated direction of arrival.

2. The wireless communication device according to claim 1, wherein the adaptive array searcher and the calibrator share a phase difference detector to detect the first phase differences and the second phase differences.

3. The wireless communication device according to claim 1, wherein the adaptive array searcher and the calibrator share an in-phase combiner and a timing calculator, and the in-phase combiner and the timing calculator carry out both of:

a first process necessary for estimating the direction of arrival, the first process comprising performing in-phase combination of the demodulated radio wave signals and calculating despreading timing for user data based on a signal obtained by the in-phase combination; and a second process necessary for correcting the different phase characteristics, the second process comprising performing in-phase combination of the demodulated reference signals and calculating despreading timing for the reference signals based on a signal obtained by the in-phase combination.

* * * * *